US008496226B2

(12) United States Patent
Dalluge et al.

(10) Patent No.: US 8,496,226 B2
(45) Date of Patent: Jul. 30, 2013

(54) FLOATING BALL VALVE SEAL WITH BELLOWS AND C-SEAL

(75) Inventors: Paul R. Dalluge, Marshalltown, IA (US); Lonnie O. Davies, Jr., Newton, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 505 days.

(21) Appl. No.: 12/771,909

(22) Filed: Apr. 30, 2010

(65) Prior Publication Data
US 2011/0266484 A1 Nov. 3, 2011

(51) Int. Cl.
F16K 25/00 (2006.01)

(52) U.S. Cl.
USPC ........ 251/159; 251/172; 251/174; 251/315.1; 251/314

(58) Field of Classification Search
USPC ............ 251/314, 316, 317, 360, 361, 315.01, 251/315.1, 315.11, 315.13, 315.33, 159, 251/172, 174; 137/15.17, 15.22, 15.09
See application file for complete search history.

(56) References Cited

U.S. PATENT DOCUMENTS

| 3,218,024 | A | * | 11/1965 | Kroekel | 251/58 |
| 3,301,523 | A | * | 1/1967 | Lowrey | 251/172 |
| 4,084,608 | A | * | 4/1978 | Laignel et al. | 137/316 |
| 4,519,579 | A | * | 5/1985 | Brestel et al. | 251/172 |
| 4,575,045 | A | * | 3/1986 | Martin et al. | 251/172 |
| 5,611,516 | A | * | 3/1997 | Reinicke et al. | 251/77 |
| 7,484,710 | B2 | * | 2/2009 | Koester et al. | 251/160 |
| 2001/0045231 | A1 | * | 11/2001 | Monod | 137/454.2 |
| 2005/0211942 | A1 | | 9/2005 | Koester et al. | |
| 2009/0095931 | A1 | * | 4/2009 | Stunkard | 251/174 |

FOREIGN PATENT DOCUMENTS

| EP | 0438611 A1 | 7/1991 |
| FR | 1511626 A | 2/1968 |

OTHER PUBLICATIONS

International Search Report for PCT US2011 033305, dated Jul. 22, 2011.
Written Opinion for PCT US2011 033305, dated Jul. 22, 2011.

* cited by examiner

*Primary Examiner* — John K Friston, Jr.
*Assistant Examiner* — Marina Tietjen
(74) *Attorney, Agent, or Firm* — Marshall, Gerstein & Borun LLP (57) ABSTRACT

A seal assembly is provided for a rotary ball valve having a top-mounted bonnet, thereby allowing the seal assembly to be installed and removed without removing the valve from the pipeline. In an embodiment, the seal assembly may include a seal ring disposed within the valve interior and biased toward the ball element of the valve. A seal carrier may be disposed between the seal ring and the valve body, and the seal carrier may be removably secured to the valve body by a plurality of bolts disposed in the valve interior. A primary leak path may exist between the seal ring and the seal carrier and a secondary leak path may exist between the seal carrier and the valve body. A bellows seal may prevent fluid flow through the primary leak path, and an auxiliary seal may prevent fluid flow through the secondary leak path.

23 Claims, 4 Drawing Sheets

FLOATING BALL VALVE SEAL WITH BELLOWS AND C-SEAL

FIELD OF THE DISCLOSURE

The present disclosure relates to fluid control devices and, more particularly, to rotary ball-type fluid control valves.

BACKGROUND

Rotary ball valves are used in a wide number of process control system applications to control some parameters of a process fluid such as a liquid, gas, slurry, etc. While the process control system may use a control valve to ultimately control the pressure, level, pH, or other desired parameter of a fluid, the control valve basically controls the rate of fluid flow.

Typically, a rotary ball valve includes a valve body defining a fluid inlet and a fluid outlet. A ball element is mounted in the valve body and rotates about a fixed axis into and out of abutment with a seal assembly, thereby controlling the amount of fluid flow through the valve. With typical bolted in-line ball valves, the seal assembly is inserted into the valve body through the fluid inlet, and retained adjacent to a flange of the valve body with a seal protector ring.

Rotary ball valve components, including the valve body, the ball element, and the seal assembly, are typically constructed of metal. This stands especially true when used in high pressure and/or high temperature applications. However, the ball element and seal assembly can suffer wear due to the repeated engagement of the ball element and seal assembly during opening and closing of the valve. The problems resulting from the wear include, but are not limited to, diminished life span of the valve components, increased frictional forces between the ball element and the seal assembly, and undesirable leakage between the ball element and the seal assembly, as well as between the seal assembly and the valve body. Similarly, because the frictional forces tend to increase as the components become more worn, the dynamic performance and control characteristics within the valve are worsened, resulting in inefficiencies and inaccuracies in the valve. To alleviate some of these concerns, some seal assemblies are biased such as to provide a more reliable seal against the ball in the closed position. Regardless of the specific type of seal assembly utilized, most conventional rotary ball valves must be unbolted from the fluid process control system to replace the seal assembly in the event it becomes worn or otherwise ineffective.

SUMMARY

In a first aspect, a valve may include a valve body having an inlet, an outlet, and a valve interior in fluid communication with the inlet and outlet. The valve may also include a bonnet removably secured to a top portion of the valve body. A ball element may be pivotably mounted in the valve interior, and an exterior surface of the ball element may define a portion of a sphere, wherein all points on the exterior surface of the ball element are not equidistant from a natural pivot point of the ball element. A seal ring may be disposed within the valve interior and biased toward the ball element, wherein the seal ring may be adapted to sealingly engage the ball element. Additionally, an anchor ring may disposed within the valve interior and secured to the valve body. A seal carrier may be disposed in the valve interior between the seal ring and the valve body, and the seal carrier may be removably secured to the anchor ring by a plurality of bolts that are disposed within the valve interior and adapted to be inserted and removed from within the valve interior. A primary leak path may exist between the seal ring and the seal carrier and a secondary leak path may exist between the seal carrier and the valve body, and the primary leak path and the secondary leak path being may each be exposed to fluid pressure within the valve. A bellows seal may be disposed between the seal ring and the seal carrier, and the bellows seal may prevent fluid flow through the primary leak path. An auxiliary seal may be disposed between the seal carrier and the valve body, and the auxiliary seal may prevent fluid flow through the secondary leak path.

In a further aspect, an alignment gap may be formed between the seal ring and the seal carrier, and the alignment gap may define a portion of the primary leak path. The alignment gap may provide a space between the seal carrier and the seal ring that allows the seal ring to radially move relative to the seal carrier such that the seal ring self-aligns when the ball element sealingly engages the seal ring.

In another aspect, the bellows seal may be secured to a portion of the seal carrier and a portion of the seal ring, and the bellows seal may be welded to both a portion of the seal carrier and a portion of the seal ring.

In a further aspect, a bellows shroud may be secured to the seal carrier such that the bellows seal is disposed between the bellows shroud and the seal carrier.

In a further aspect, the second auxiliary disposed between the seal carrier and the valve body may be a C-seal. A mouth of the C-seal may open towards a direction of fluid flow in the secondary leak path. The C-seal may be disposed in a recess formed in the seal carrier. The C-seal may sealingly engage a portion of the valve body and a portion of the recess formed in the seal carrier to prevent fluid flow through the secondary leak path.

In a still further aspect, the second auxiliary seal disposed between the seal carrier and the valve body may be an annular gasket.

In another aspect, a wave spring may bias the seal ring towards the ball element, and the wave spring may be disposed in a recess formed in the seal ring.

In a further aspect, the axial displacement of the seal ring away from the seal carrier may be limited by a seal retainer that is coupled to the seal carrier, and the seal retainer may be removably secured to the seal carrier by a plurality of bolts that are disposed within the valve interior.

In another aspect, each of the plurality of bolts may threadedly engage both a threaded bore formed in a flange portion of the seal carrier and a threaded bore formed in the anchor ring.

A method of installing a seal ring assembly may include providing a ball valve including a valve body having an inlet, an outlet, and a valve interior in fluid communication with the inlet and outlet. A bonnet opening may be provided adjacent to a top portion of the valve body. A ball element may be pivotably mounted in the valve interior, and an exterior surface of the ball element may define a portion of a sphere, and all points on the exterior surface of the ball element are not equidistant from a natural pivot point of the ball element. A seal carrier sub-assembly may be assembled in a location not within the valve interior. The seal carrier sub-assembly may include a seal carrier having an inner recess, a seal ring disposed within the inner recess, wherein the seal ring is adapted to sealingly engage the ball element. The seal carrier sub-assembly may further include a bellows seal secured to both the seal ring and the seal carrier, and an auxiliary seal may be coupled to the seal carrier. The seal carrier sub-assembly may be inserted into the bonnet opening such that the seal carrier sub-assembly is disposed within the valve interior. In addition, the seal carrier sub-assembly may be secured to the valve body such that the bellows seal prevents fluid from flowing through a primary leak path that exists between the seal ring and the seal carrier and such that the auxiliary seal prevents fluid from flowing through a secondary leak path that exists between the seal carrier and the valve body. A bonnet may be secured to the valve body to cover the bonnet opening.

In another aspect, securing the seal carrier sub-assembly to the valve body may include inserting a plurality of bolts through a plurality of corresponding threaded bores formed in the seal carrier, and wherein each of the bolts threadedly engages a corresponding threaded bore formed in an anchor ring. The anchor ring may be secured to the valve body within the valve interior.

In a further aspect, an alignment gap may be provided between the seal ring and seal carrier, and the alignment gap may define a portion of the primary leak path. The alignment gap may provide a space between the seal carrier and the seal ring that allows the seal ring to radially move relative to the seal carrier such that the seal ring self-aligns when the ball element sealingly engages the seal ring.

In a still further aspect, the axial displacement of the seal ring away from the seal carrier may be limited by a seal retainer that is coupled to the seal carrier. In addition, the auxiliary seal is one of a C-seal disposed in an outer recess of the seal carrier and a gasket secured to a bottom wall of the seal carrier.

DETAILED DESCRIPTION

Figure 1:
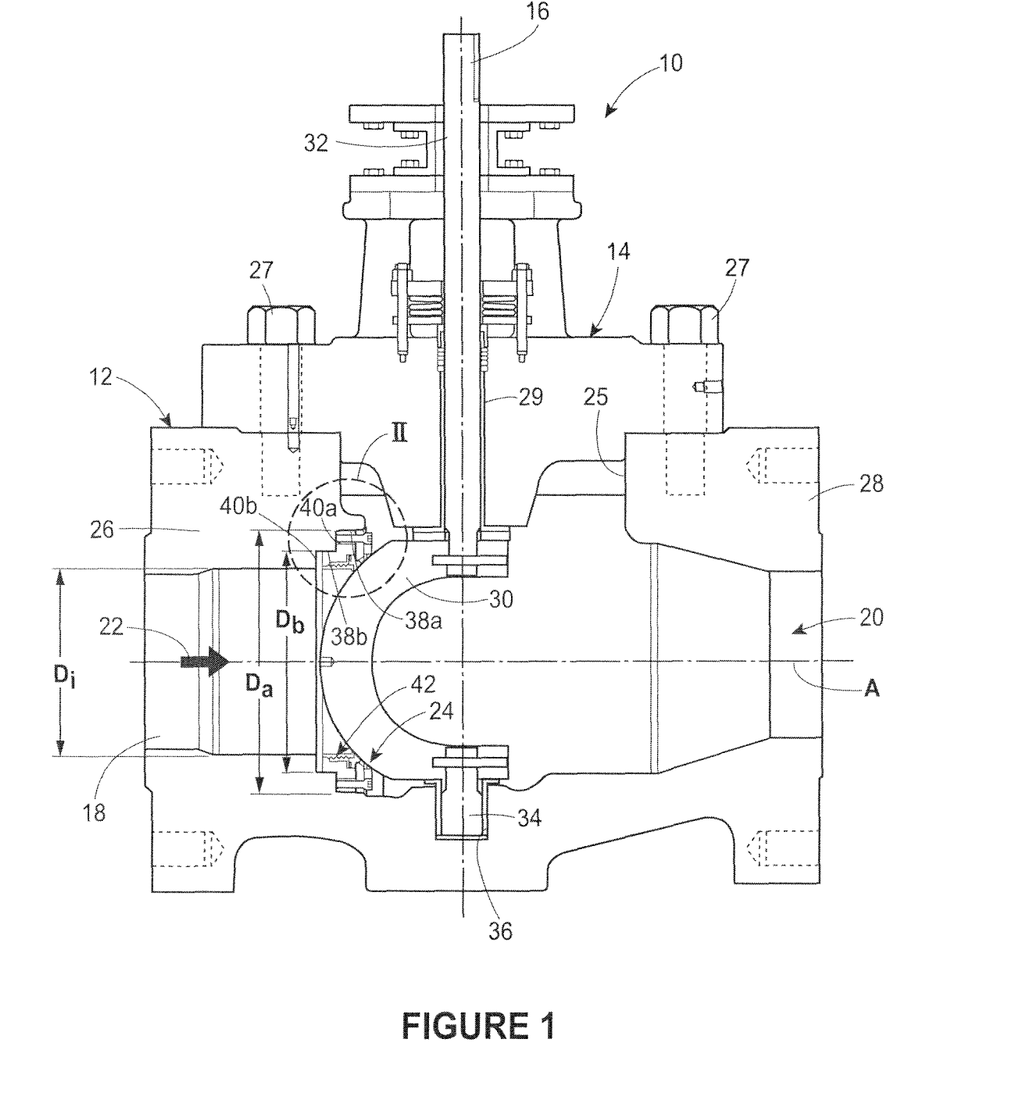
FIG. 1 is a cross-sectional view of a rotary ball valve constructed in accordance with the principles of the present disclosure.

FIG. 1 depicts a rotary ball valve 10 constructed in accordance with the principles of the disclosure, and generally including a valve body 12, a bonnet 14, a control assembly 16, and a seal assembly 24. The valve body 12 has a generally cylindrical shape and includes an inlet portion 18, an outlet portion 20, a primary flowpath 22, and a bonnet opening 25 located adjacent to a top portion of the valve body 12. As indicated by the arrow, the primary flowpath 22 extends from the inlet portion 18 to the outlet portion 20 in a direction that is generally parallel to a longitudinal axis A. The inlet portion 18 is surrounded by an inlet flange 26. The outlet portion 20 is surrounded by an outlet flange 28. The inlet flange 26 and the outlet flange 28 are adapted to couple the ball valve 10 into a process control pipeline such as by bolting, welding, clamping, or any other known means.

The bonnet 14 includes a generally cylindrical structure bolted into the bonnet opening 25 of the valve body 12 with a plurality of bonnet bolts 27. The bonnet 14 defines a through-bore 29 that supports various components of the control assembly 16, as is generally known. The control assembly 16 includes a ball element 30, a drive shaft 32, and a support shaft 34. The drive shaft 32 is disposed through the through-bore 29 in the bonnet 14 and is adapted to be coupled to a rotary actuator in a known manner. The support shaft 34 is disposed within a blind bore 36 formed in a wall of the valve body 12 that is opposite the bonnet opening 25. The through-bore 29 in the bonnet 14 and the blind bore 36 in the valve body 12 can include bearings as is known in the art to facilitate consistent unencumbered rotational displacement of the shafts 32, 34 and, therefore, the ball element 30 during operation of the ball valve 10.

The ball element 30 typically includes a cammed ball element, as is known in the art, to facilitate a repeatable seal with the seal assembly 24 when in the closed position, as shown in FIG. 1. More specifically, an exterior surface of the ball element 30 may define a portion of a sphere, wherein all points on the exterior surface of the ball element are not equidistant from a natural pivot point of the ball element, such as the rotational axis of each of the shafts 32, 34.

In the example shown, the seal assembly 24 is mounted in the valve body 12 at an interior location that is downstream from the inlet portion 18, and generally adjacent to the bonnet opening 25. So configured, when the seal assembly 24 requires replacement, the bonnet 14 and control assembly 16 can be removed from the valve body 12, and the seal assembly 24 is loaded through the bonnet opening 25. This eliminates the need to remove the entire valve 10 from the pipeline, in which it is mounted, to replace the seal assembly 24, which is highly advantageous when the valve 10 is butt-welded into position.

To accommodate the seal assembly 24, the disclosed embodiment of the valve body 12 defines an internal recess 42 disposed completely downstream from the inlet portion 18 of the valve body 12. Said another way, the internal recess 42 is disposed between the inlet portion 18 of the valve body 12 and the ball element 30 of the control assembly 16. The recess 42 of the disclosed embodiment is generally annular in shape and has a stepped profile defined by internal surfaces of the valve body 12 including first and second cylindrical surfaces 38a, 38b, and first and second transverse surfaces 40a, 40b.

The second cylindrical surface 38b is disposed between the inlet portion 18 of the valve body 12 and the first cylindrical surface 38a, when considered relative a direction of the flow path 22 depicted in FIG. 1. Similarly, the second axial surface 40b is disposed between the inlet portion 18 of the valve body 12 and the first axial surface 40a, when considered relative to the direction of the flowpath 22 depicted in FIG. 1.

Moreover, as illustrated, the first cylindrical surface 38a has a first diameter Da that is larger than a second diameter Db of the second cylindrical surface 38b. The first and second diameters Da, Db are each larger than an inlet diameter Di of the inlet portion 18 of the valve body 12.

With the valve body 12 so configured, the seal assembly 24 is mounted in the valve 10 through the bonnet opening 25, as mentioned above, thereby enabling the valve to be used in environments that require the inlet and outlet flanges 26, 28 to be butt-welded in-line, as opposed to bolted in-line configurations. Of course, this design could also be used with bolted valve bodies, or otherwise. Moreover, the seal assembly 24 of the disclosed embodiment is disposed in the internal recess 42 such that when the ball element 30 is closed, as shown in FIG. 1, the seal assembly 24 is completely disposed between the ball element 30 and the inlet portion 18 of the valve body 12. While the internal recess 42 of the valve body 12 depicted in FIG. 1 has been described as including a stepped profile defined by two internal cylindrical surfaces 38a, 38b and two transverse surfaces 40*a*, 40*b*, alternative embodiments of the present disclosure can have more or less than two internal cylindrical surfaces and two transverse surfaces depending, for example, on the specific design of the seal assembly 24 and/or other considerations.

Figure 2:
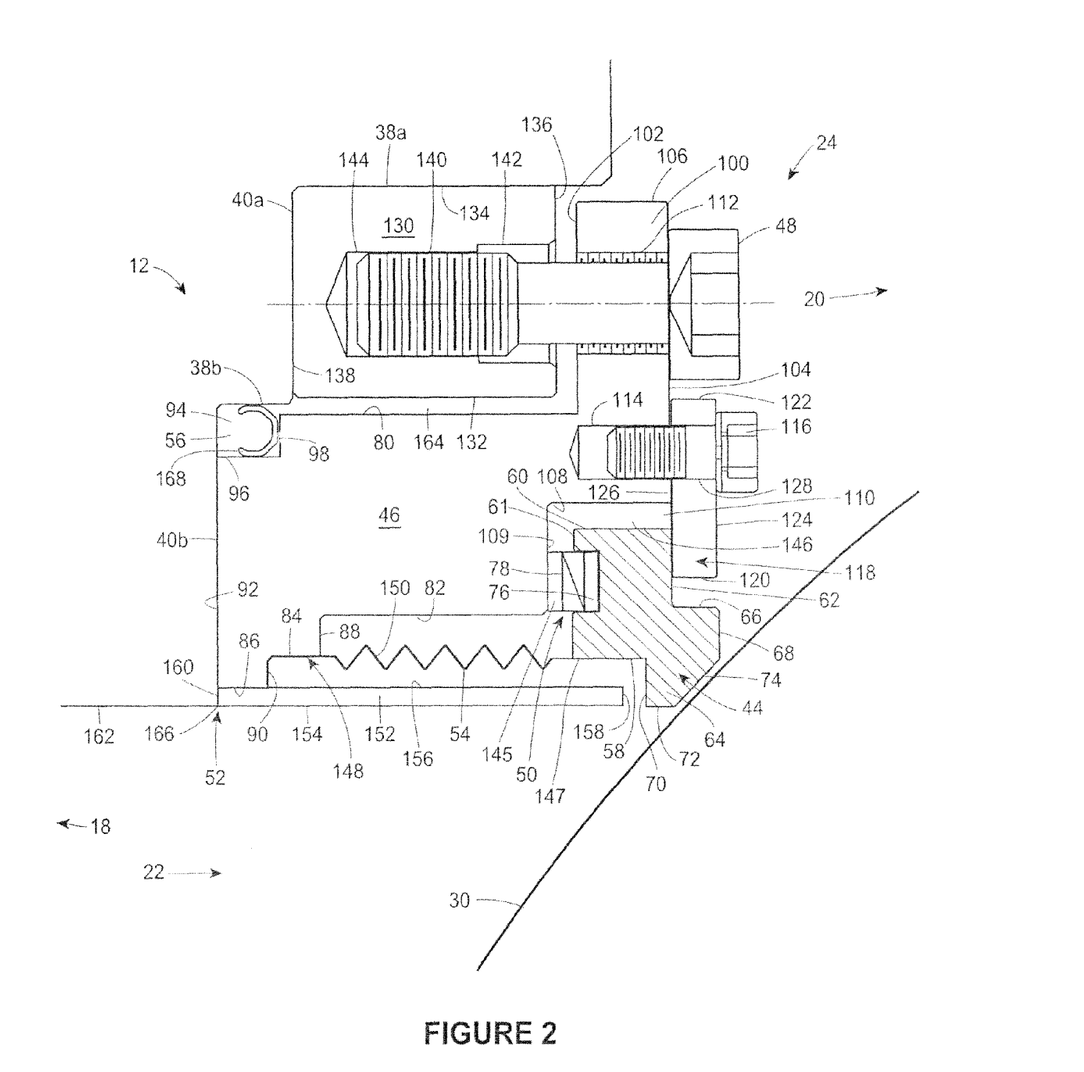
FIG. 2 is an enlarged fragmentary cross-sectional view taken at Circle II of FIG. 1 and illustrating an embodiment of the seal assembly of the rotary ball valve with the rotary ball valve shown in the open position.

Referring now to FIG. 2, which is a detail view taken from Circle II of FIG. 1, one specific embodiment of a seal assembly 24 constructed in accordance with the teachings of the present disclosure will be described.

The seal assembly 24 includes a seal ring 44 disposed within the interior of the valve body 12. The seal ring 44 is biased toward the ball element to sealingly engage the ball element 30. An anchor ring 130 may be disposed within the valve interior and secured to the valve body 12. A seal carrier 46 is disposed between the seal ring 44 and the valve body 12, and the seal carrier 46 is removably secured to the anchor ring 130 by a plurality of bolts 48 that are disposed in the interior of the valve body 12. A primary leak path 50 exists between the seal ring 44 and the seal carrier 46 and a secondary leak path 52 exists between the seal carrier 46 and the valve body 12. Both the primary leak path and the secondary leak path are exposed to fluid pressure within the rotary ball valve 10. A bellows seal 54 extends between the seal carrier 46 and the seal ring 44 to prevent fluid flow through the primary leak path 50. Additionally, an auxiliary seal 56 is disposed between the seal carrier 46 and the valve body 12, and the auxiliary seal prevents fluid flow through the secondary leak path.

As discussed above, the seal ring 44 of the seal assembly 24 is generally annular in shape and may be machined from a wear-resistant metal, such as Alloy 6 or stainless steel with Alloy 6 hardfacing, for example. As illustrated in the cross-sectional view of FIG. 2, the seal ring 44 may be defined laterally by a cylindrical seal inner wall 58 and a cylindrical seal outer wall 60, and a seal bottom wall 61 may extend from the seal outer wall 60 to the inner wall 58 in a radial direction. The seal ring 44 may be further defined by a seal top wall 62 that extends from the seal outer wall 60 towards the inner wall 58, and the seal top wall 62 may be parallel to and axially offset from the seal bottom wall 61. A seal ring protrusion 64 may extend from the seal top wall 62, and the seal ring protrusion 64 may be defined by a cylindrical side protrusion wall 66 that may extend from the seal top wall 62 in an axial direction (i.e., a direction parallel to the longitudinal axis A). A top protrusion wall 68 may extend inwardly from the side protrusion wall 66 in a direction parallel to the seal top wall 62. A bottom protrusion wall 70 may inwardly extend from the seal inner wall 58 in a radial direction, and a cylindrical inner protrusion wall 72 may extend from the bottom protrusion wall 70 in an axial direction. A ball engagement surface 74 may extend between the top protrusion wall 68 and the inner protrusion wall 72, and the ball engagement surface 74 may be concave in shape. More specifically, the ball engagement surface 74 may be contoured to mate with a corresponding portion of the spherical outer surface of the ball element 30 such that when the rotary ball valve 10 is moved into the closed, or seated, position (shown in FIG. 3), the ball engagement surface 74 of the seal ring 44 sealingly engages the ball element 30. The ball engagement surface 74 may be hard-faced to enhance seal cycle life and to prevent seat line galling.

The seal ring 44 may also include an annular spring recess 76 disposed between the seal inner wall 58 and the seal outer wall 60. The spring recess 76 may axially extend from the seal bottom wall 61 towards the seal top wall 62, and the spring recess 76 may have a generally rectangular cross-sectional shape. However, the spring recess 76 may have any shape or combination of shapes suitable for a particular application. The spring recess 76 may be adapted to receive a resilient element, such as the wave spring 78 illustrated in FIGS. 2 and 3.

Figure 3:
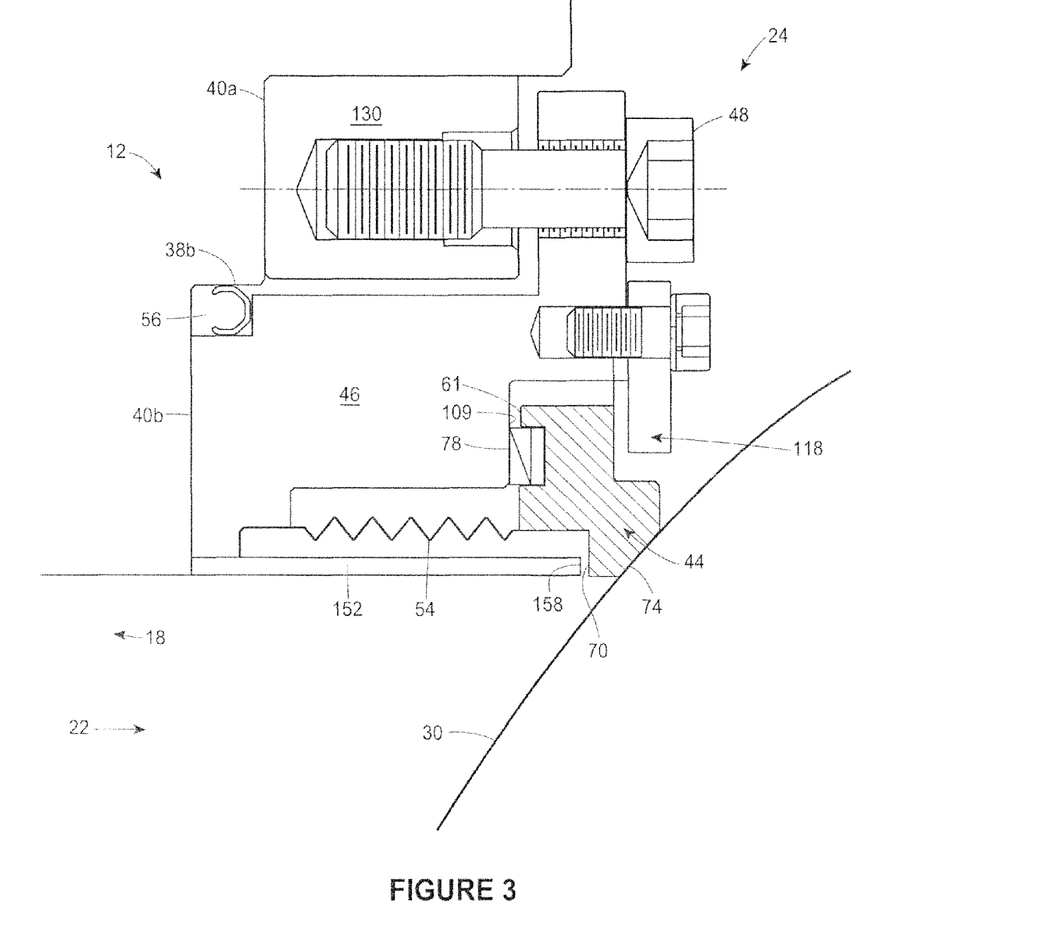
FIG. 3 is another enlarged fragmentary cross-sectional view similar to FIG. 2 and showing the rotary ball valve in the closed position.

As illustrated in FIGS. 2 and 3, the seal assembly 24 also includes an annular seal carrier 46 disposed within the interior of the valve body 12 between the seal ring 44 and the valve body 12. The seal carrier 46 may be machined from a corrosion-resistant metal, such as stainless steel, for example. The seal carrier 46 may have both a stepped interior profile and a stepped exterior profile. Specifically, the seal carrier 46 may be laterally defined by a cylindrical carrier outer wall 80 that extends in a generally axial direction and a cylindrical carrier inner wall 82 that is inwardly offset from the carrier outer wall 80. A cylindrical carrier intermediate wall 84 may be inwardly offset from the carrier inner wall 82, and a cylindrical carrier lower wall 86 may be inwardly offset from the carrier intermediate wall 84. A planar carrier intermediate top wall 88 may radially extend from the carrier inner wall 82 to the carrier intermediate wall 84, and a planar carrier lower top wall 90 may radially extend from the carrier intermediate wall 84 to the carrier lower wall 86. A planar carrier bottom wall 92 may outwardly extend from the carrier lower wall 86 in a radial direction, and the carrier bottom wall 92 may define a bottom-most surface of the seal carrier 46. A carrier outer recess 94 may be defined by a cylindrical recess side wall 96 axially extending from the carrier bottom wall 92 and a recess top wall 98 radially extending from the carrier outer wall 80 to the recess side wall 96. However, the carrier outer recess 94 may be formed by any number or shape of surfaces that provide a recess where the carrier bottom wall 92 intersects the carrier outer wall 80.

An annular carrier flange 100 may extend in a generally radial direction away from the carrier outer wall 80, and the carrier flange 100 may be defined by a flange bottom wall 102 that radially extends away from the carrier outer wall 80. The carrier flange 100 may be further defined by a flange top wall 104 that may be parallel to and offset from the flange bottom wall 102. A cylindrical flange outer wall 106 may axially extend between the flange bottom wall 102 and the flange top wall 104, and a cylindrical flange inner wall 108 may be radially offset from the flange outer wall 106 and may extend between the flange top wall 104 and a carrier top wall 109, and the carrier top wall 109 may radially extend to the carrier inner wall 82. Because the carrier top wall 109 is orthogonal to the flange inside wall 108, a carrier inner recess 110 may be formed that is diagonally opposed to the carrier outer recess 94 of the seal carrier 46. A plurality of flange bores 112 may be symmetrically arrayed around the carrier flange 100. The flange bores 112 may axially extend from the flange top wall 104 to the flange bottom wall 102. Each of the flange bores 112 may have a threaded portion, and each of the flange bores 112 may be adapted to receive a threaded captive bolt 48. In addition, a plurality of carrier blind bores 114 may be symmetrically arrayed around the seal carrier 46, and each blind bore 114 may axially extend from the flange top wall 104 towards the carrier bottom wall 92. Each blind bore 114 may have a threaded portion, and each blind bore 114 may be adapted to receive a cap screw 116.

As illustrated in FIGS. 2 and 3, the seal assembly 24 may also include an annular seal retainer 118 adapted to secure the seal ring 44 within the carrier inner recess 110 of the seal carrier 46. The seal retainer 118 may be machined from a corrosion-resistant metal, such as stainless steel, for example. The seal retainer 118 may be laterally defined by a cylindrical retainer inner wall 120 and a cylindrical retainer outer wall 122 that each extend in a generally axial direction. A planar retainer top wall 124 and a planar retainer bottom wall 126 that is parallel to and axially offset from the retainer top wall 124 may extend in a generally radial direction and may intersect the retainer inner wall 120 and retainer outer wall 122 to further define the seal retainer 118. A plurality of retainer bores 128 may be symmetrically arrayed around the seal retainer 118, and each retainer bore 128 may axially extend between the retainer top wall 124 and the retainer bottom wall 126. In addition, each of the retainer bores 128 may be positioned to axially align with a corresponding carrier blind bore 114, and a cap screw 116 may be inserted into each of the retainer bores 128 such that the threaded portion of the cap screw 116 threadedly engages the threaded portion of the carrier blind bore 114, thereby removably securing the seal retainer 118 to the seal carrier 46.

The diameter of the cylindrical retainer inner wall 120 of the seal retainer 118 may be greater than the diameter of the cylindrical side protrusion wall 66 of the seal ring 44 and less than the diameter of the cylindrical seal outer wall 60 of the seal ring 44. Therefore, when the seal ring 44 is disposed within the carrier inner recess 110 of the seal carrier 46 and the seal retainer 118 is secured to the seal carrier 46, the retainer bottom wall 126 extends radially inward past the flange inside wall 108 of the seal carrier 46 such that the cylindrical retainer inner wall 120 is radially disposed between the cylindrical side protrusion wall 66 and the cylindrical seal outer wall 60 of the seal ring 44 regardless of the degree of radial shifting of the seal ring 44 within the carrier inner recess 110 of the seal carrier 46. In addition, when assembled as described above, the axial distance between the seal top wall 62 and the seal bottom wall 61 is smaller than the axial distance between the retainer bottom wall 126 of the seal retainer 118 and the carrier top wall 109 of the seal carrier 46.

As illustrated in FIGS. 2 and 3, the seal assembly 24 may also include an annular anchor ring 130 adapted to be secured to the valve body 12. The anchor ring 130 may be machined from a corrosion-resistant metal, such as stainless steel, for example. The anchor ring 130 may be laterally defined by a cylindrical anchor inner wall 132 and a cylindrical anchor outer wall 134 that each extend in a generally axial direction. A planar anchor top wall 136 and a planar anchor bottom wall 138 that is parallel to and axially offset from the anchor top wall 136 may extend in a generally radial direction and may intersect the anchor inner wall 132 and anchor outer wall 134 to further define the anchor ring 130. The anchor ring 130 may be secured to the valve body 12 in the internal recess 42 of the valve body 12. More specifically, the anchor outer wall 134 may substantially abut the first cylindrical surface 38*a* of the internal recess 42, and the anchor bottom wall 138 may substantially abut the first transverse surface 40*a* of the of the internal recess 42. In this position, the diameter of the cylindrical anchor inner wall 132 may be slightly greater than the diameter of the second cylindrical surface 38*b* of the internal recess 42. To secure the anchor ring 130 to the valve body 12, a threaded portion (not shown) of the anchor outer wall 134 may threadedly engage a threaded portion (not shown) of the first cylindrical surface 38*a* of the valve body 12. Alternatively, one or more welds (not shown) may secure the anchor ring 130 to the valve body 12, or the anchor ring 130 may be secured to the valve body 12 by a combination of a threaded engagement and welding.

A plurality of anchor bores 140 may be symmetrically arrayed around the anchor ring 130, and each anchor bore 140 may axially extend from the anchor top wall 136 towards the anchor bottom wall 138. In addition, when the anchor ring 130 is secured to the valve body 12, each of the anchor bores 140 may be positioned to axially align with a corresponding flange bore 112 of the seal carrier 46. So configured, a captive bolt 48 may be inserted into each of the threaded flange bores 112 and rotated such that the captive bolt 48 advances towards the corresponding anchor bore 140. After extending through a gap between the flange bottom wall 102 of the seal carrier 46 and the anchor top wall 138 of the anchor ring 130, the distal end of the captive bolt 48 is then received into an enlarged diameter portion 142 before threadedly engaging the threaded portion 144 of the anchor bore 140. During operation, vibrations within the rotary ball valve 10 may cause one or more of the captive bolts 48 to disengage from the threaded portion 144 of the anchor bore 140. Despite this disengagement, the captive bolt 48 is prevented from axial displacement through the flange bore 112 of the seal carrier 46 by the threaded portion of the flange bore 112, thereby preventing the captive bolt 48 from falling out of the anchor bore 140 and into the interior of the valve body 12.

Referring again to FIGS. 2 and 3, the anchor ring 130 may be secured to the valve body 12, and the seal carrier 46 may be secured to the anchor ring 130 by the plurality of captive bolts 48. In addition, the seal ring 44 may be disposed within the carrier inner recess 110 of the seal carrier 46, and the seal ring 44 may be secured within the carrier inner recess 110 by the seal retainer 118 in the manner described above. As explained above, the axial distance between the seal top wall 62 of the seal ring 44 and the seal bottom wall 61 is smaller than the axial distance between the retainer bottom wall 126 of the seal retainer 118 and the carrier top wall 109 of the seal carrier 46. Accordingly, a first gap 145 may exist between the seal ring 44 and the seal carrier 46. The first gap 145 between the seal ring 44 and the seal carrier 46 allows the seal ring 44 to be axially displaced by the ball element 30 towards the inlet portion 18 (and against the biasing force of the wave spring 78) as the rotary ball valve 10 is moved into the closed position, thereby ensuring that the seal ring 44 sealingly engages the ball element 30. When the rotary ball valve 10 is in an open position (i.e., when the ball element 30 is not in contact with ball engagement surface 74 of the seal ring 44), as illustrated in FIG. 2, the wave spring 78 disposed within the spring recess 76 of the seal ring 44 biases the seal ring 44 towards the ball element 30. Because the seal retainer 118 is secured to the seal carrier 46, the axial distance between the carrier top wall 109 of the seal carrier 46 and the retainer bottom wall 126 is fixed, thereby limiting the axial displacement of the seal ring 44 by the wave spring 78 towards the ball element 30.

In addition to the first gap 145 described above, an alignment gap 146 may exist between the seal carrier 46 and the seal ring 44. More specifically, because the diameter of the cylindrical seal outer wall 60 of the seal ring 44 is smaller than the diameter of the cylindrical flange inside wall 108 of the seal carrier 46, the alignment gap 146 may exist between the surfaces of the seal ring 44 and the seal carrier 46. Due to the alignment gap 146, the seal ring 44 may radially shift relative to the seal carrier 46 when the seal ring 44 is engaged by the ball element 30, thereby allowing the seal ring 44 to radially and axially self-align to compensate for any ball/seal ring 44 misalignments due to machining tolerances to improve the seal between the seal ring 44 and the ball element 30.

Upon the closing of the rotary ball valve 10, the seal bottom wall 61 of the seal ring 44 may not sealingly engage the carrier top wall 109 of the seal carrier 46, thereby creating a primary leak path 50 between the seal ring 44 and the seal carrier 46 along the first gap 145. Because the process fluid flowing through the flowpath 22 is at a higher pressure on the inlet portion 18 side of the ball element 30 than on the outlet portion 20 side, the process fluid has a tendency to flow through the primary leak path 50, which may be in fluid communication with the outlet portion 20 side of the ball element 30. To prevent process fluid flow through this primary leak path 50, a bellows seal 54 may be disposed between the seal ring 44 and the seal carrier 46. More specifically, a first end portion 147 of the bellows seal 54 may be secured to the seal inner wall 58 of the seal ring 44, and a second end portion 148 of the bellows seal 54 may be secured to the carrier intermediate wall 84 of the seal carrier 46. Because the carrier intermediate wall 84 of the seal carrier 46 may be axially aligned with the seal inner wall 58 of the seal ring 44, the bellows seal 54 may extend in a generally axial direction. The first and second end portions 147, 148 may be secured to the seal ring 44 and the seal carrier 46, respectively, by a welding process, such as laser welding. Specifically, the weld may extend circumferentially along the entire edge of the first and second edge portions 147, 148. Alternatively, the weld may only extend along portions of the first and second edge portions 147, 148, or discrete points along the first and second edge portions 147, 148 may be welded. However, instead of a weld, the bellows seal 54 may be secured to the seal ring 44 and the seal carrier 46 by any means common in the art. Because the bellows seal 54 is radially flexible and can be axially compressed due to the sinusoidal bellows portion 150, the bellows seal 54 does not affect the seal ring's 44 ability to axially and radially displace relative to the seal carrier 46.

As illustrated in FIGS. 2 and 3, the seal assembly 24 may also include a cylindrical bellows shroud 152 secured to the seal carrier 46 to protect the bellows seal 54. The bellows shroud 152 may be defined by an axial inner wall 154 and outer wall 156, and a top wall 158 and bottom wall 160 that radially extend between the inner and outer wall 154, 156. The bottom wall 160 of the bellows shroud 152 may be radially aligned with the carrier bottom wall 92 of the seal carrier 46, and the outer wall 156 may be axially aligned with the carrier lower wall 86 of the seal carrier 46. Additionally, the inner wall 154 may be axially aligned with a cylindrical inlet wall 162 of the valve body 12. A portion of the bottom wall 160 of the bellows shroud 152 may be secured to a portion of the carrier bottom wall 92 of the seal carrier 46 by a welding process, such as laser welding. Alternatively, the bellows shroud 152 may be secured to the seal carrier 46 by any means common in the art. When the bellows shroud 152 is secured to the seal carrier 46, a small axial gap may exists between the top wall 158 of the bellows shroud 152 and the bottom protrusion wall 70 of the seal ring 44 when the seal bottom wall 61 of the seal ring 44 is at its bottom-most position adjacent to the carrier top wall 109 of the seal carrier 46. As configured, the seal shroud 152 protects the bellows seal 54 from direct flow impingement and streamlines the flow passage adjacent the seal ring 44.

As illustrated in FIG. 3, when the ball element 30 is moved into the closed position, the ball element 30 contacts the ball engagement surface 74 of the seal ring 44 and displaces the seal ring 44 towards the carrier top wall 109 of the seal carrier 46. Due to high fluid pressure in the inlet side 18 of the valve 10, process fluid may enter the gap between the top wall 158 of the bellows shroud 152 and the bottom protrusion wall 70. However, because the bellows seal 54 extends between the seal ring 44 and the seal carrier 46, process fluid is prevented from entering the first leak path 50 between the seal ring 44 and the seal carrier 46.

Referring to FIG. 2, when the seal carrier 46 is secured to the anchor ring 130 by the plurality of captive bolts 48 in the manner previously described, the cylindrical inner wall 154 of the bellows shroud 152 may be substantially coextensive with a cylindrical inlet wall 162 that partially defines the inlet portion 18. Additionally, the diameter of cylindrical carrier outer wall 80 may be smaller than the anchor inner wall 132, thereby creating a lateral gap 164 between the seal carrier 46 and the anchor ring 130. Because the seal carrier 46 is not directly secured to the valve body 12, a second gap 166 may exist between the second transverse surface 40b of the internal recess 42 of the valve body 12 and both the carrier bottom wall 92 of the seal carrier 46 and the bottom wall 160 of the bellows shroud 152. Both the second gap 166 and the lateral gap 164 may be in fluid communication with a portion of the valve interior that is on the outlet portion 20 side of the seal between the seal ring 44 and the ball element 30 when the rotary ball valve 10 is in the closed position. Because the process fluid flowing through the flowpath 22 is at a higher pressure on the inlet portion 18 side of the ball element 30 than on the outlet portion 20 side, the process fluid has a tendency to flow into the second gap 166 and through the lateral gap 164 to the portion of the valve interior that is on the outlet portion 20 side of the seal between the seal ring 44 and the ball element 30 when the rotary ball valve 10 is in the closed position. Accordingly, a secondary leak path 52 may exist between the valve body 12 and the seal carrier 46.

To prevent process fluid flow through the secondary leak path 52, an auxiliary seal 56, such as the C-seal 168 illustrated in FIGS. 2 and 3, may be disposed in the carrier outer recess 94 of the seal carrier 46 such that the mouth of the C-seal 168 faces axially upwards towards the second transverse surface 40b of the valve body 12. As such, the mouth of the C-seal faces the fluid flow through the secondary leak path 52. As process fluid flows into the second gap 166 of the secondary leak path 52, the fluid enters the carrier outer recess 94 and the mouth of the C-seal 168 disposed within the carrier outer recess 94. As the relatively high-pressure fluid enters the interior of the C-seal 168 through the mouth, the C-seal 168 outwardly expands such that an outer surface of the C-seal 168 sealingly engages the recess side wall 96 and the recess top wall 98 of the carrier outer recess 94 in addition to sealingly engaging the second cylindrical surface 38b of the internal recess 42 of the valve body 12, thereby preventing process fluid from flowing between the seal carrier 46 and the valve body 12 downstream of the C-seal 168 and sealing the secondary leak path 52. Because the C-seal 168 is stationary relative to the seal carrier 46 and the valve body 12, the C-seal 168 may be referred to as a static C-seal.

As explained previously, when it is desired to remove the seal assembly 24 from the valve body 12, it is not necessary to remove the valve body 12 from the pipeline in which it is mounted. Instead, the valve bonnet 14 may be removed from the valve body 12 by loosening and removing each of the plurality of bonnet bolts 27. With the bonnet 14 removed, the control assembly 16 and the ball element 30 may be removed from the valve body 12 through the bonnet opening 25. Next, the seal carrier 46 may be removed from the anchor ring 130. Specifically, a wrench or other appropriate tool may be inserted into the valve interior through the bonnet opening 25 and each of the captive bolts 48 may be rotated by the wrench until the threaded portion of each captive bolt 48 threadedly disengages from both the threaded portion 144 of the anchor bore 140 and the threaded flange bore 112. The seal carrier 46, with the seal ring 44, seal retainer 118, bellows seal 54, and bellows shroud 152 still attached thereto to form a seal carrier 46 sub-assembly, may then be extracted from the internal recess 42 of the valve body 12 and removed through the bonnet opening 25. Once outside of the valve interior, the seal retainer 118 may be decoupled from the seal carrier 46 sub-assembly by removing each of the cap screws 116.

With the seal retainer 118 removed, the seal ring 44 may be removed from the carrier inner recess 110 of the seal carrier 46 and may be displaced away from the seal carrier 46 to allow the wave spring 78 to be removed and replaced from the seal ring 44. If necessary, the bellows shroud 152 may be removed from the seal carrier 46, and the bellows seal 54 may then be removed from the both the seal carrier 46 and seal ring 44. With the seal retainer 118 removed, the seal ring 44 may be removed from the carrier inner recess 110 of the seal carrier 46.

To install the seal assembly 24 to the valve body 12, the seal assembly 24 is first partially assembled outside of the valve interior. Specifically, a resilient element, such as the wave spring 78, is placed in the spring recess 76 of the seal ring 44 in the manner previously described. The seal ring 44, which is coupled to the seal carrier 46 by the bellows seal 54, is then positioned in the carrier inner recess 110 of the seal carrier 46, and the seal retainer 118 is placed over the seal ring 44 such that each retainer bore 128 is axially aligned with a corresponding carrier blind bore 114 formed in the seal carrier 46. Each of the plurality of cap screws 116 is then rotated into threaded engagement with the corresponding carrier blind bore 114 to secure the seal retainer 118 to the seal carrier 46. A C-seal 168 is then placed within the carrier outer recess 94 of the seal carrier 46. The seal carrier 46 sub-assembly is then inserted into the valve interior through the bonnet opening 25, and the seal carrier 46 sub-assembly may be centered within the internal recess 42 of the valve body 12 by aligning the flange outer wall 106 of the seal carrier 46 with the first cylindrical surface 38a of the valve body 12. Each of the flange bores 112 of the seal carrier 46 may then be axially aligned with a corresponding anchor bore 140 of the anchor ring 130. Each of the captive bolts 48 may then inserted into a corresponding flange bore 112 from within the valve interior and rotated until the threaded portion of the captive bolt 48 threadedly engages the threaded portion 144 of the anchor bore 140 of the anchor ring 130. As assembled, the seal ring 44 may not be initially positioned within the carrier inner recess 110 to ensure a proper seal between the ball engagement surface 74 of the seal ring 44 and a portion of the spherical exterior of the ball element 30. However, due to the self-aligning property of the seal ring 44 previously described, the ball element 30 will axially and radially displace the seal ring 44 within the carrier inner recess 110 as the ball element 30 contacts the ball engagement surface 130 during the closing of the rotary ball valve 10.

Figure 4:
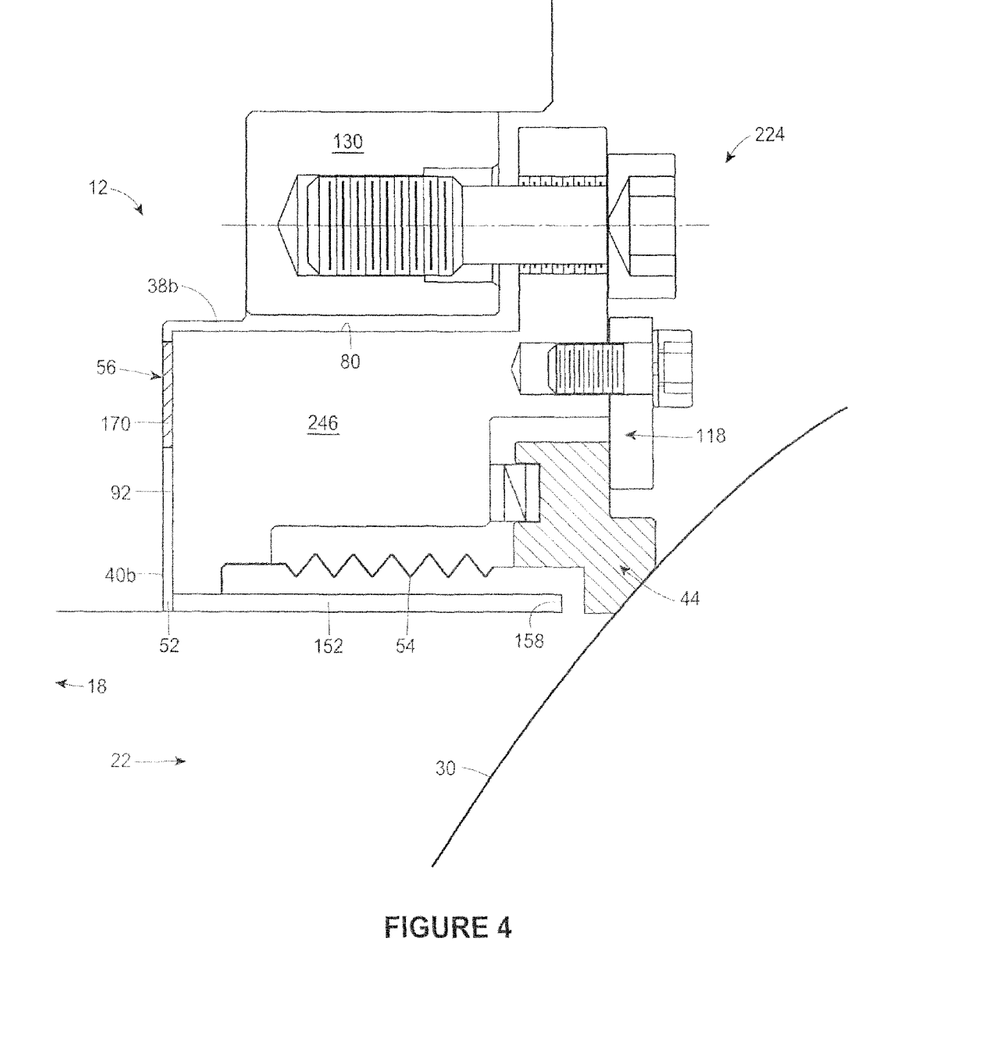
FIG. 4 is another enlarged fragmentary cross-sectional view similar to FIG. 2 but showing a seal assembly assembled in accordance with the teachings of another disclosed example of the present invention.

In another embodiment illustrated in FIG. 4, the seal assembly 224 may be substantially identical to the seal assembly 24 described above. However, in the seal carrier 246 of the seal assembly 224, the cylindrical carrier outer wall 80 of the seal carrier 246 axially extends to the carrier bottom wall 92, and therefore no carrier outer recess 94 is formed. Consequently, the second auxiliary seal 56 of the seal assembly 224 is not a C-seal 154, but is instead an annular gasket 170 disposed in the secondary leak path 52 between the carrier bottom wall 92 and the second transverse surface 40b of the valve body 12. To facilitate handling and installation, the gasket 170 may be bonded to the carrier bottom wall 92 of the seal carrier 246 in any manner that is common in the art. Accordingly, the process of removing or installing the seal assembly 224 is substantially identical to the processes described above.

As described, the seal assemblies 24, 224 eliminate several parts used in conventional sealing assemblies, thereby reducing the cost of the valve. Moreover, the parts that are used, such as the seal carrier 46, may be easily and cheaply machined. In addition, the seal carrier 46 sub-assembly may be inserted into the valve interior through the bonnet opening 25 without removing the valve from the pipeline. Furthermore, as explained above, the seal ring 44 may axially and radially move relative to the seal carrier 46, allowing the seal ring 44 to self-align to compensate for ball/seal misalignments. In addition, the bellows seal 54 prevents all fluid flow through the primary leak path 50, thereby providing complete bi-directional shut-off (i.e., shut-off for flow along the primary flowpath 22, as described herein, and flow opposite to the primary flowpath 22 that flows from the outlet portion 20 to the inlet portion 18). Moreover, the use of the bellows seal 54 may extend the useful temperature capability above valves that rely on elastomeric seals.

While various embodiments have been described above, this disclosure is not intended to be limited thereto. Variations can be made to the disclosed embodiments that are still within the scope of the appended claims.

What is claimed:
1. A valve comprising:
a valve body having an inlet, an outlet, and a valve interior in fluid communication with the inlet and outlet;
a bonnet removably secured to a top portion of the valve body;
a ball element pivotably mounted in the valve interior, an exterior surface of the ball element defining a portion of a sphere, wherein all points on the exterior surface of the ball element are not equidistant from a central pivot point of the ball element disposed along a rotational axis of the ball element;
a seal ring disposed within the valve interior and biased toward the ball element, wherein the seal ring is adapted to sealingly engage the ball element;
a seal carrier disposed in the valve interior between the seal ring and the valve body, the seal carrier being removably secured to the valve body by a plurality of bolts that are both disposed within the valve interior and adapted to be inserted and removed from within the valve interior, wherein a primary leak path exists between the seal ring and the seal carrier and a secondary leak path exists between the seal carrier and the valve body, the primary leak path and the secondary leak path being exposed to fluid pressure within the valve;
a bellows seal disposed between the seal ring and the seal carrier, the bellows seal preventing all fluid flow through the entire primary leak path, wherein the bellows seal is secured to a radially-inward portion of the seal carrier and a radially-inward portion of the seal ring; and
an auxiliary seal disposed between the seal carrier and the valve body, the auxiliary seal preventing fluid flow through the secondary leak path.

2. The valve of claim 1, wherein an alignment gap is formed between the seal ring and the seal carrier, the alignment gap defining a portion of the primary leak path, the alignment gap providing a space between the seal carrier and the seal ring that allows the seal ring to radially move relative to the seal carrier such that the seal ring self-aligns when the ball element sealingly engages the seal ring.

3. The valve of claim 1, wherein the bellows seal is welded to both a portion of the seal carrier and a portion of the seal ring.

4. The valve of claim 1, wherein a bellows shroud is secured to the seal carrier such that the bellows seal is disposed between the bellows shroud and the seal carrier.

5. The valve of claim 1, wherein the second auxiliary seal disposed between the seal carrier and the valve body is a C-seal.

6. The valve of claim 5, wherein a mouth of the C-seal faces a direction of fluid flow passing through the secondary leak path.

7. The valve of claim 5, wherein the C-seal is disposed in a recess formed in the seal carrier.

8. The valve of claim 7, wherein the C-seal sealingly engages a portion of the valve body and a portion of the recess formed in the seal carrier to prevent fluid flow through the secondary leak path.

9. The valve of claim 1, wherein the second auxiliary seal disposed between the seal carrier and the valve body is an annular gasket.

10. The valve of claim 1, wherein a wave spring biases the seal ring towards the ball element.

11. The valve of claim 10, wherein the wave spring is disposed in a recess formed in the seal ring.

12. The valve of claim 1, wherein the axial displacement of the seal ring away from the seal carrier is limited by a seal retainer that is coupled to the seal carrier.

13. The valve of claim 12, wherein the seal retainer is removably secured to the seal carrier by a plurality of bolts that are disposed within the valve interior.

14. The valve of claim 1, wherein each of the plurality of bolts threadedly engages a threaded bore formed in an anchor ring secured to the valve body.

15. The valve of claim 14, wherein each of the plurality of bolts is adapted to engage a threaded inner surface of a corresponding threaded bore formed in a flange portion of the seal carrier, and wherein the threaded bore formed in the anchor ring is axially aligned with the threaded bore formed in a flange portion of the seal carrier.

16. A method of installing a seal ring assembly, comprising:
providing a ball valve including a valve body having an inlet, an outlet, a valve interior in fluid communication with the inlet and outlet, and a bonnet opening adjacent to a top portion of the valve body;
pivotably mounting a ball element in the valve interior, an exterior surface of the ball element defining a portion of a sphere, wherein all points on the exterior surface of the ball element are not equidistant from a central pivot point of the ball element disposed along a rotational axis of the ball element;
assembling a seal carrier sub-assembly in a location not within the valve interior, wherein the seal carrier sub-assembly comprises:
a seal carrier having an inner recess;
a seal ring disposed within the inner recess, wherein the seal ring is adapted to sealingly engage the ball element;
a bellows seal secured to both the seal ring and the seal carrier; and
an auxiliary seal coupled to the seal carrier;
inserting the seal carrier sub-assembly into the bonnet opening such that the seal carrier sub-assembly is disposed within the valve interior;
securing the seal carrier sub-assembly to the valve body such that the bellows seal prevents fluid from flowing through a primary leak path that exists between the seal ring and the seal carrier and such that the auxiliary seal prevents fluid from flowing through a secondary leak path that exists between the seal carrier and the valve body, wherein securing the seal carrier sub-assembly to the valve body includes inserting a plurality of bolts through a plurality of corresponding threaded bores formed in the seal carrier, and wherein each of the bolts threadedly engages a corresponding threaded bore formed in an anchor ring, the anchor ring being secured to the valve body within the valve interior; and
securing a bonnet to the valve body to cover the bonnet opening.

17. The method of claim 16, further comprising providing an alignment gap between the seal ring and seal carrier, the alignment gap defining a portion of the primary leak path, the alignment gap providing a space between the seal carrier and the seal ring that allows the seal ring to radially move relative to the seal carrier such that the seal ring self-aligns when the ball element sealingly engages the seal ring.

18. The method of claim 16, further comprising limiting the axial displacement of the seal ring away from the seal carrier by a seal retainer that is coupled to the seal carrier.

19. The method of claim 16, wherein the auxiliary seal is one of a C-seal disposed in an outer recess of the seal carrier and a gasket secured to a bottom wall of the seal carrier.

20. A valve comprising:
a valve body having an inlet, an outlet, and a valve interior in fluid communication with the inlet and outlet;
a bonnet removably secured to a top portion of the valve body;
a ball element pivotably mounted in the valve interior, an exterior surface of the ball element defining a portion of a sphere, wherein all points on the exterior surface of the ball element are not equidistant from a central pivot point of the ball element disposed along a rotational axis of the ball element;
a seal ring disposed within the valve interior and biased toward the ball element, wherein the seal ring is adapted to sealingly engage the ball element;
an anchor ring disposed within the valve interior and secured to the valve body;
a seal carrier disposed in the valve interior between the seal ring and the valve body, the seal carrier being removably secured to the anchor ring by a plurality of bolts that are both disposed within the valve interior and adapted to be inserted and removed from within the valve interior, wherein a primary leak path exists between the seal ring and the seal carrier and a secondary leak path exists between the seal carrier and the valve body, the primary leak path and the secondary leak path being exposed to fluid pressure within the valve, wherein each of the plurality of bolts threadedly engages both a threaded bore formed in a flange portion of the seal carrier and a threaded bore formed in the anchor ring;
a bellows seal disposed between the seal ring and the seal carrier, the bellows seal preventing fluid flow through the primary leak path; and
an auxiliary seal disposed between the seal carrier and the valve body, the auxiliary seal preventing fluid flow through the secondary leak path.

21. A valve comprising:
a valve body having an inlet, an outlet, and a valve interior in fluid communication with the inlet and outlet;
a bonnet removably secured to a top portion of the valve body;
a ball element pivotably mounted in the valve interior, an exterior surface of the ball element defining a portion of a sphere;
a seal ring disposed within the valve interior and biased toward the ball element, wherein the seal ring is adapted to sealingly engage the ball element;
an anchor ring disposed within the valve interior and secured to the valve body, the anchor ring disposed adjacent to the ball element;

a seal carrier disposed in the valve interior between the seal ring and the valve body, the seal carrier being removably secured to the anchor ring by a plurality of bolts that are both disposed within the valve interior and adapted to be inserted and removed from within the valve interior, wherein a primary leak path exists between the seal ring and the seal carrier and a secondary leak path exists between the seal carrier and the valve body, the primary leak path and the secondary leak path being exposed to fluid pressure within the valve;

a bellows seal disposed between the seal ring and the seal carrier, the bellows seal preventing fluid flow through the primary leak path; and an auxiliary seal disposed between the seal carrier and the valve body, the auxiliary seal preventing fluid flow through the secondary leak path.

22. The valve of claim 21, wherein the bellows seal is secured to a portion of the seal carrier and a portion of the seal ring such that the bellows seal prevents all fluid flow through the entire primary leak path.

23. The valve of claim 21, wherein the ball element is a cammed ball element.

\* \* \* \* \*